(12) United States Patent
Siering et al.

(10) Patent No.: US 12,663,763 B2
(45) Date of Patent: Jun. 23, 2026

(54) METHOD FOR OPTIMIZING AN OPERATION OF A DYNAMOELECTRIC MACHINE

(71) Applicant: Siemens Aktiengesellschaft, Munich (DE)

(72) Inventors: Till-Christian Siering, Forchheim (DE); Christoph Nolting, Höchstadt/Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 121 days.

(21) Appl. No.: 18/291,093

(22) PCT Filed: Apr. 14, 2022

(86) PCT No.: PCT/EP2022/060086
§ 371 (c)(1),
(2) Date: Jan. 22, 2024

(87) PCT Pub. No.: WO2023/001417
PCT Pub. Date: Jan. 26, 2023

(65) Prior Publication Data
US 2025/0147469 A1 May 8, 2025

(30) Foreign Application Priority Data
Jul. 23, 2021 (EP) .................................... 21187350

(51) Int. Cl.
G05B 13/02 (2006.01)
(52) U.S. Cl.
CPC ............................... G05B 13/0205 (2013.01)
(58) Field of Classification Search
CPC .... G05B 13/0205; H04L 67/125; H02P 23/14

USPC ................................................... 318/632, 560
See application file for complete search history.

(56) References Cited

U.S. PATENT DOCUMENTS

| | | | | |
|---|---|---|---|---|
| 7,969,113 B2 * | 6/2011 | Ide | ........................... | H02P 6/34 |
| | | | | 318/632 |
| 8,174,224 B2 * | 5/2012 | Chakrabarti | .......... | H02P 29/032 |
| | | | | 318/434 |
| 9,990,590 B2 * | 6/2018 | Kawai | ................... | G06F 11/006 |
| 10,784,807 B2 * | 9/2020 | Bhamidipati | ............. | G05F 1/66 |
| 2018/0331646 A1 | 11/2018 | Bhamidipati et al. | | |

FOREIGN PATENT DOCUMENTS

| | | | |
|---|---|---|---|
| DE | 102012103245 A1 | 10/2013 | |
| DE | 10 2017 127 887 A1 | 5/2019 | |
| EP | 3 220 609 A1 | 9/2017 | |

OTHER PUBLICATIONS

PCT International Search Report and Written Opinion of International Searching Authority mailed Jul. 25, 2022 corresponding to PCT International Application No. PCT/EP2022/060086 filed Apr. 14, 2022.

* cited by examiner

*Primary Examiner* — David Luo
(74) *Attorney, Agent, or Firm* — Henry M. Feiereisen LLC

(57) ABSTRACT

In a method for optimizing an operation of a dynamoelectric machine correction data for the dynamoelectric machine is requested by a client from a server. An identification number is transmitted by the client to the server, in particular via the Internet, and the correction data is transmitted by the server to the client. The dynamoelectric machine is operated based on the obtained correction data.

6 Claims, 2 Drawing Sheets

METHOD FOR OPTIMIZING AN OPERATION OF A DYNAMOELECTRIC MACHINE

CROSS-REFERENCES TO RELATED APPLICATIONS

This application is the U.S. National Stage of International Application No. PCT/EP2022060086, filed Apr. 14, 2022, which designated the United States and has been published as International Publication No. WO 2023/001417 and which claims the priority of European Patent Application, Serial No. 21187350.0, filed Jul. 23, 2021, pursuant to 35 U.S.C. 119 (a)-(d).

BACKGROUND OF THE INVENTION

The Invention relates to a method for optimizing an operation of a dynamoelectric machine.

Electric motors frequently have ripples in their rotational speed and their torque, which are caused for example by cogging torques in permanent magnet-excited synchronous machines. Other manufacturing tolerances can also impair true running of the machine.

This can lead to losses of quality in the application of the electric motor. In the example of machine tools, this can be demonstrated by a lack of surface quality of the manufactured parts.

In order to compensate for interfering variables, the electric motors are measured during manufacturing and correction data is stored in encoder electronics of the electric motor.

For this purpose, however, sufficient storage space is required.

SUMMARY OF THE INVENTION

The object underlying the invention is that of improving an electric motor to this effect.

The object is achieved by a method for optimizing an operation of a dynamoelectric machine with the following steps:

- a client requesting correction data for the dynamoelectric machine from a server,
- the client transmitting an identification number, in particular via the Internet, to the server,
- the server transmitting the correction data to the client,
- operating the dynamoelectric machine as a function of the correction data obtained.

The identification number is advantageously a unique identifier for a particular machine or a particular machine type or machine model.

The correction data advantageously has compensation data for compensating for the rotational speed and torque ripple of dynamoelectric machines, in particular electric motors, and/or for compensating for manufacturing tolerances of the electric machine.

The correction data is determined during and/or after the manufacturing of the machine, for example by measurements, and is advantageously deposited in a database. Contents of the database can advantageously be retrieved by the server.

The invention offers the advantage that no expensive storage, in particular storage in the encoder, is required for this purpose.

The invention is advantageous in that no in-house or order developments are needed for expanding storage space in the encoder. Standard encoders can be used.

The dynamoelectric machine is operated on the basis of the correction data.

The invention offers the advantage that ripples in the rotational speed and the torque are reduced or compensated and thus optimal true running of the dynamoelectric machine is ensured.

Thus, for example, machine tools making use of this method can ensure good surface quality.

In one advantageous embodiment, the identification number has a serial number of the dynamoelectric machine.

The identification number can also be the serial number of the machine.

The serial number is advantageous as the series is unique for a unique item. The serial number is a unique identifier for the machine.

The correction data advantageously has data for reducing and/or compensating for manufacturing tolerances, torque ripple, rotational speed ripple and/or cogging torque.

The object is also achieved by a drive for performing the method, having a dynamoelectric machine and a converter.

Advantageously, the converter has the client.

The client is advantageously implemented in a piece of converter software.

The object is also achieved by a system, having a drive of this kind and a server, The drive and the server are preferably connected via the Internet.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figures 1, 2:
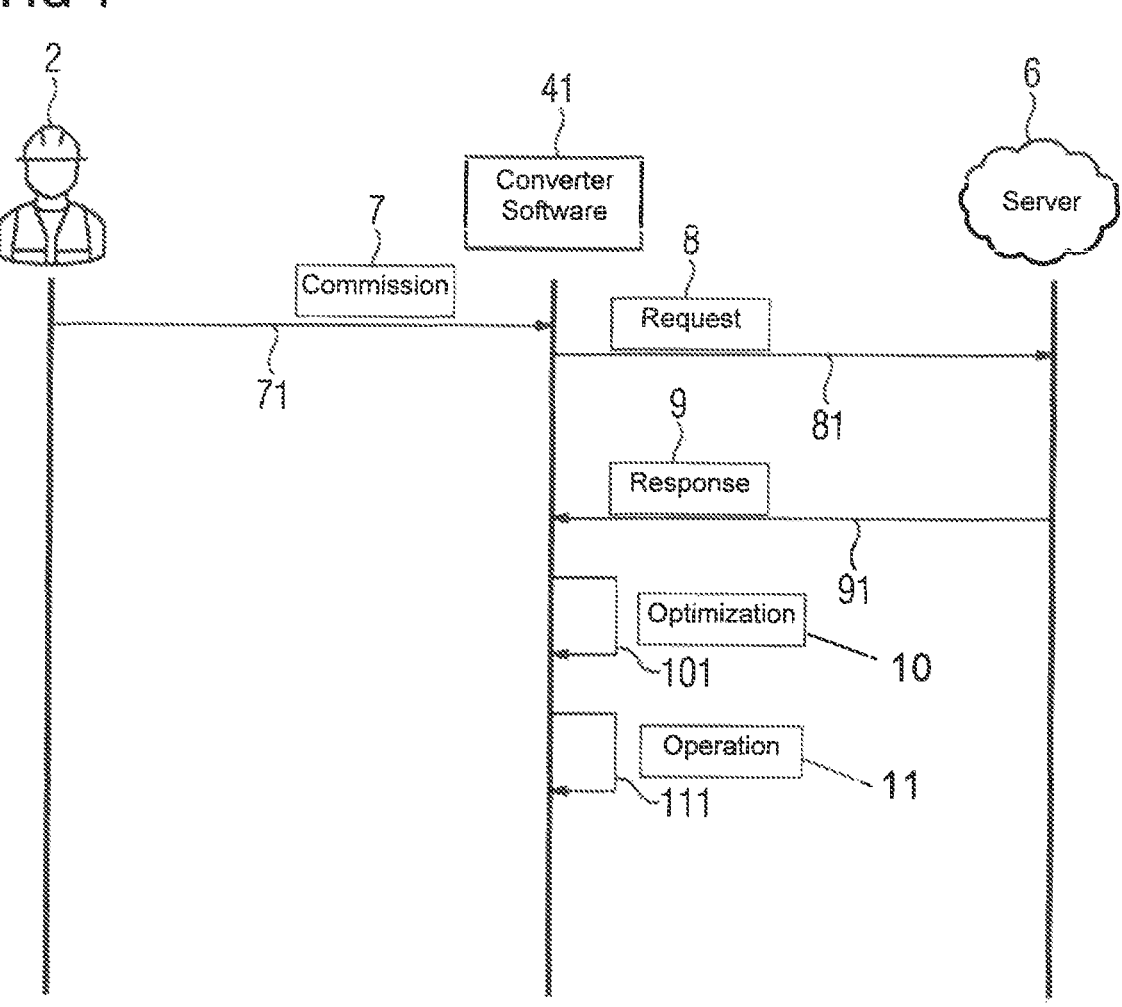
FIG. 1 shows an interaction of a system.
FIG. 2 shows a system.

FIG. 1 shows an interaction of a system 3 (see FIG. 2).

In FIG. 1, a drive is put into operation by a person 2. Other manners of commissioning are also possible.

The person 2 starts the commissioning 7 by addressing a piece of converter software 41, represented by arrow 71.

The converter software 41 makes a request 8 to a server 6, represented by arrow 81. By way of the request 8, correction data for a particular machine is requested. This takes place by an identification number for identifying the machine being transmitted.

The server 6 is advantageously embodied as a web server.

The identification number is advantageously a serial number of the dynamoelectric machine.

Simultaneous transmission of the request and identification number is advantageous.

An exemplary request 8 may be:

Request_Compensation_Data(Serialnumber)

The server transmits the correction data to the client, represented by arrow 91.

An exemplary response 9 may be:

Send_Compensation_Data(Serialnumber)

Advantageously, the correction data is incorporated into a closed-loop controller of the machine.

The dynamoelectric machine is optimized on the basis of the correction data.

In FIG. 1, the optimization 10 takes place within the converter software 41, represented by arrow 101, for example by: Optimize_Motor_Control(Compensation_Data).

The dynamoelectric machine is operated on the basis of the correction data. In FIG. 1, the operation takes place within the converter software 42, represented by arrow 111, for example by: Operate_Motor(Compensation_Data).

FIG. 2 shows the system 3.

In FIG. 2, the system 3 has a dynamoelectric machine 1 and a converter 4. The converter 4 has the converter software 41.

The dynamoelectric machine 1 and the converter 4 are interconnected.

The converter 4 is connected to the server 6, advantageously via the Internet.

In other words: The correction data is in the Cloud.

Figure 3:
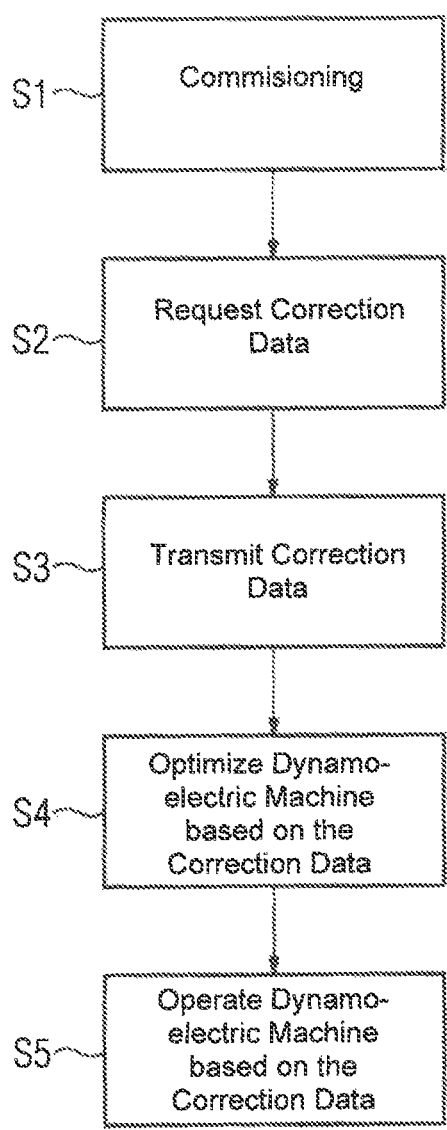
FIG. 3 shows method steps.

FIG. 3 shows the method steps.

The commissioning takes place in a method step S1. The method is also suitable, however, for operation following the commissioning.

In a method step S2, the correction data is requested. The Inverter software 41 requests the correction data from the server 6 in FIG. 1.

In a method step S3, the correction data is transmitted. The server transmits the correction data to the inverter software 41 according to FIG. 1.

In a method step S4, the dynamoelectric machine is optimized on the basis of the correction data.

In a method step S5, the dynamoelectric machine is operated on the basis of the correction data.

The invention offers the advantage that there is no need for storage space in the encoder electronics, if the correction data is loaded into the closed-loop controller with the aid of the server, in particular a server of the manufacturer of the machine, as part of the commissioning of the motor.

The invention offers the advantage that a standard portfolio of an encoder manufacturer can be used and, with the method described, interfering variables due to principles or manufacturing can be corrected. It is not necessary to adapt standard vendor parts (in particular encoders).

In the event of repair of the encoder, there is no need for reprogramming of the encoder with the correction data, as this is advantageously stored in a database and can be retrieved again.

A request to a web service by the client is advantageous. The web service advantageously forwards the processing of the request to a web server.

Advantageously, the unique item, I.e. the machine 1, is measured and the correction data obtained from the measurement is made available to a web service.

During the commissioning, the converter preferably downloads the correction data for optimized closed-loop control.

What is claimed is:

1. A method for optimizing operation of a dynamoelectric machine, comprising:

determining by way of measurements correction data during or after manufacturing of the dynamoelectric machine, wherein the correction data comprises data for reducing or compensating for manufacturing tolerances, torque ripple, rotational speed ripple or cogging torque;

depositing the correction data in a database;

a client requesting the correction data for the dynamoelectric machine from a server;

the client transmitting to the server an identification number of the dynamoelectric machine which contains a serial number of the dynamoelectric machine;

the server transmitting the correction data to the client; and operating the dynamoelectric machine based on the transmitted correction data.

2. The method of claim 1, wherein the identification number is transmitted from the client to the server via the Internet.

3. A drive, comprising:

a dynamoelectric machine; and a converter, wherein in the drive is configured to execute the method of claim 1.

4. The drive of claim 3, wherein the converter comprises the client.

5. A system, comprising:

the drive of claim 3, and a server.

6. The system of claim 5, wherein the drive and the server are connected via the Internet.

\* \* \* \* \*